July 7, 1942.  C. G. SEYFERTH  2,289,079
FIFTH WHEEL CONSTRUCTION
Filed March 23, 1940  3 Sheets-Sheet 1

Witness:
Geo L. Chapel

Inventor
Carl G. Seyferth

By Rice any Rice
Attorney

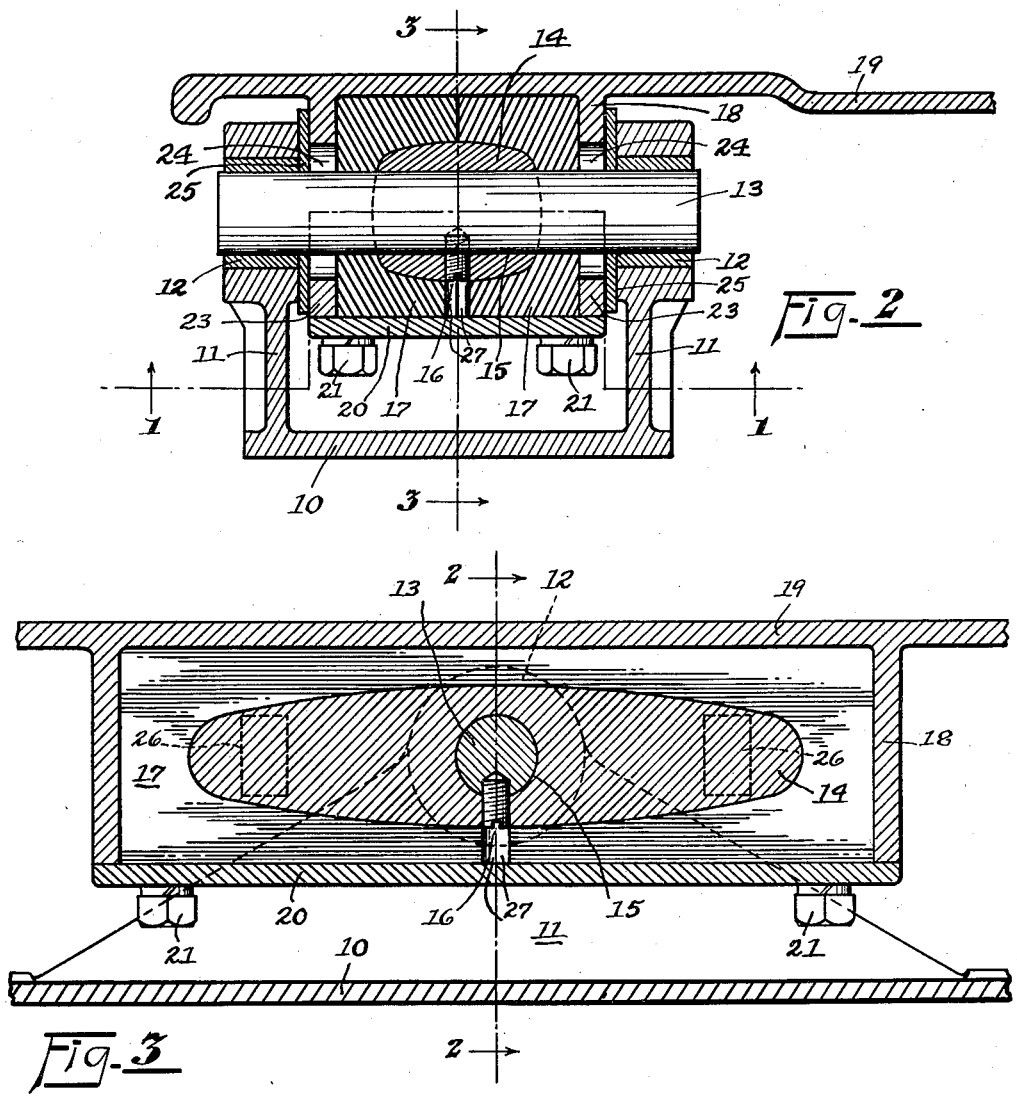

July 7, 1942.  C. G. SEYFERTH  2,289,079
FIFTH WHEEL CONSTRUCTION
Filed March 23, 1940  3 Sheets-Sheet 3

Witness:
Geo L. Chapel

Inventor
Carl G. Seyferth

By Rich and Rich
Attorney

Patented July 7, 1942

2,289,079

UNITED STATES PATENT OFFICE 2,289,079

FIFTH WHEEL CONSTRUCTION

Carl G. Seyferth, Muskegon, Mich., assignor to West Michigan Steel Foundry Co., Muskegon, Mich., a corporation of Michigan Application March 23, 1940, Serial No. 325,499

4 Claims. (Cl. 280—33.1)

The present invention relates to fifth wheel constructions and more particularly to yieldable fifth wheel coupling means for trailers and tractors of the general type disclosed in my Patents Nos. 1,968,573 and 2,063,405, issued July 31, 1934, and December 8, 1936, respectively.

The primary objects of the instant invention are to provide a fifth wheel construction which is an improvement over those shown in the above identified patents; to provide a fifth wheel construction which is so constructed and so mounted that the major part of the interrelative movement between the bearing and cushioning members is in the line of draft of the tractor, thereby eliminating undue torsional or other flexing of the cushioning members and lending stability to the fifth wheel structure; to provide a pair of oppositely disposed ellipsoidal bearing members having a maximum of freedom of movement relative to their respective cushioning members; to provide a pair of laterally spaced bearing members which are independently movable relative to their cushioning members; and, to provide cooperable bearing members and cushioning members of such configuration that relative movement between each bearing member and its cushioning member is substantially uniformly resisted in any direction of interrelative movement.

Illustrative embodiments of the invention are shown in the accompanying drawings, wherein:

Figure 2 is an enlarged sectional view on line 2—2 of Figure 1 and a sectional view on line 2—2 of Figure 3;

Figure 3 is a sectional view on line 3—3 of Figure 2;

Figure 1:
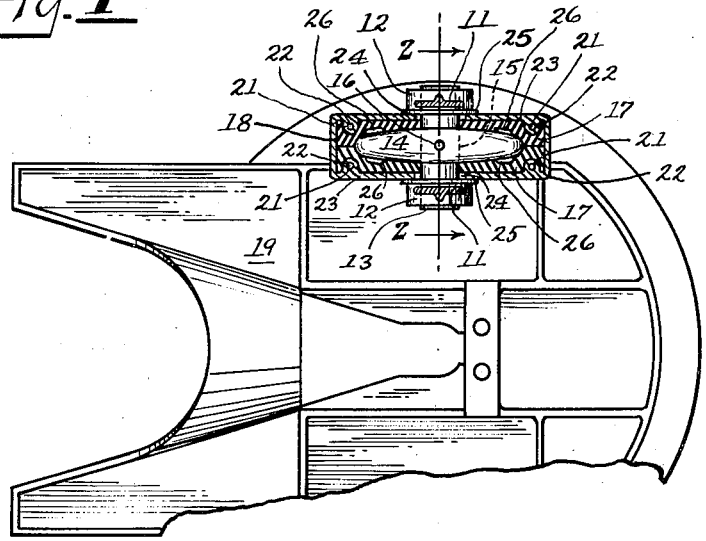
Figure 1 is a fragmentary bottom plan view of a fifth wheel construction embodying the present invention, shown partially in section on line 1—1 of Figure 2.
Figure 4:
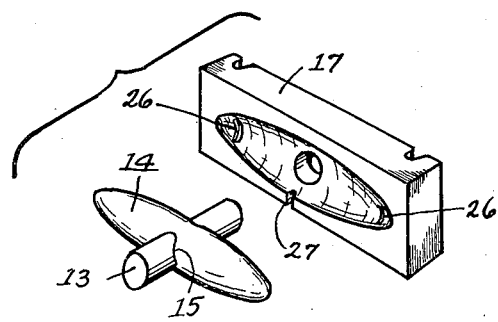
Figure 4 is a perspective view of a bearing member and of one of the cushioning members therefor.

Referring then to the drawings wherein like parts of the structure are designated by the same numerals in the several views, the fifth wheel construction shown in Figures 1-4 inclusive comprises a pair of spaced brackets 10 which are adapted to be secured to the frame of a truck, tractor or the like in any suitable manner.

Inasmuch as the brackets 10 are identical in construction, only one of the same has been illustrated. Each bracket 10 is provided with a pair of horizontally spaced upstanding webs 11 which webs are provided with transversely aligned journal bearings 12 through which the opposite ends of the shaft 13 project.

An ellipsoidal bearing member 14 is provided with a transverse bore 15 concentric with its minor axis and the shaft 13, intermediate its ends, is disposed within said bore 15 and secured therein by means of a set screw 16 threaded in the bearing member 14 and the shaft 13.

A pair of complementary cushioning members 17 disposed within a housing 18 which is here shown as cast integrally with the plate member 19 surround the ellipsoidal bearing member 14 and the projecting portions of the shaft 13. A bottom plate 20 is secured to the housing 18 as by means of bolts 21 passing through apertures in the bottom plate 20 threaded in bosses 22 which are cast integrally with the sides 23 of the housing 18, said bottom plate 20 being thus removable for replacement of the cushioning members 17.

The opposite end portions of the shaft 13 pass through apertures 24 in the opposite sides 23 of the housing 18, said apertures 24 being of greater diameter than the shaft 13 to permit freedom of movement of the shaft 13 therein. A washer 25 is preferably interposed between each side 23 of the housing 18 and the journal bearing 12 adjacent thereto.

The complementary cushioning members 17 are preferably of molded rubber and are provided with voids 26 adjacent the ellipsoidal bearing member 14 which voids permit the flow of the rubber when the rubber is under pressure. Complementary semicylindrical notches 27 in the cushioning members 17 give access to the set screw 16 upon removal of the bottom plate 20.

It will be seen that by virtue of the central disposition of the shaft 13 relative to the bearing member 14 and its cushioning members 17, interrelative movement between the bearing and their respective cushioning members is directly in the line of vehicle draft, there being no tilting movement of the bearing member 14 within its housing 18 except as may be effected by relative angular inclination of the towing and towed vehicles. Thus and by virtue of the ellipsoidal configuration of the bearing member 14 whose major axis extends forwardly-rearwardly of the fifth wheel, forward-rearward movement of the bearing member 14 within its housing 18 is substantially uniformly resisted and cushioned by the complementary cushioning members 17.

It will be further seen that the above advantages obtain even in instances of sidewise relative angular inclination between the towing and the towed vehicles since the brackets 10 and their supported bearing members 14 are independently spacedly mounted on the towing vehicle.

Figure 5:
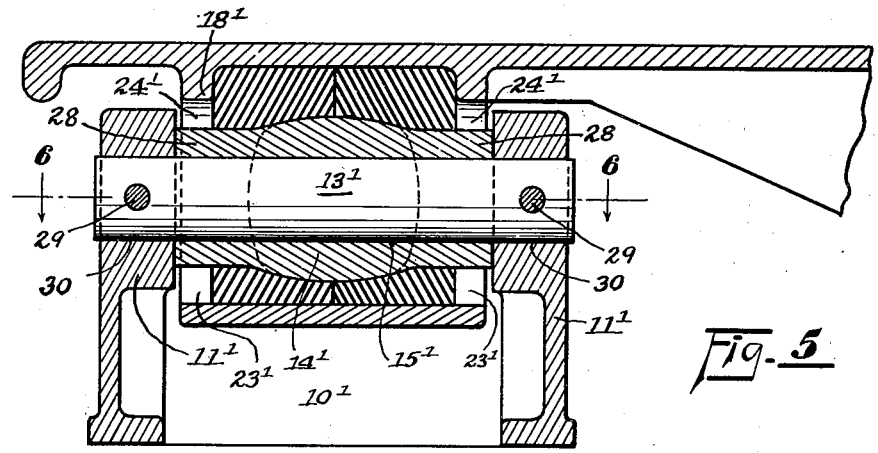
Figure 5 is a sectional view similar to Figure 2 illustrating a modified form of construction.
Figure 6:
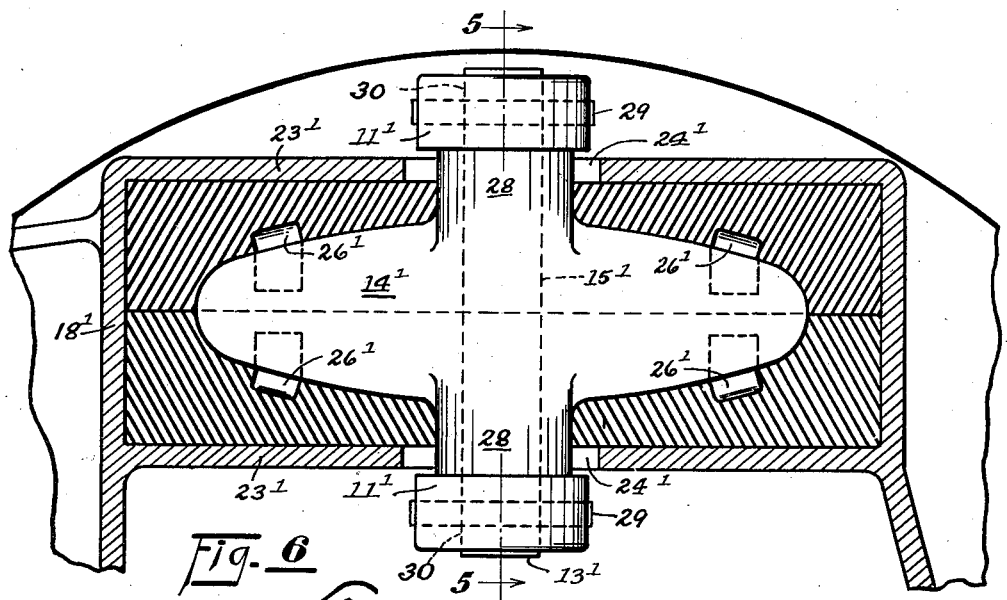
Figure 6 is a sectional view thereof on line 6—6 of Figure 5.
Figure 7:
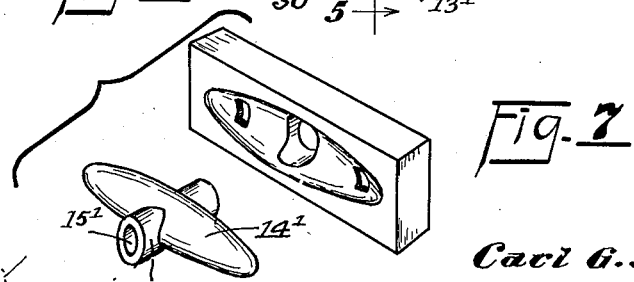
Figure 7 is a perspective view of a bearing member and one of the cushioning members of the modification shown in Figures 5 and 6.

In the modified embodiment of the invention shown in Figures 5-7 inclusive, hub bosses 28 are cast integrally with the ellipsoidal bearing member 14¹ and a transverse bore 15¹ extends through the bearing member 14¹ and its hub bosses 28 to accommodate the shaft 13¹ whose opposite ends are fixedly secured, as by pins 29, in annular openings 30 in the upstanding webs 11¹ of the bracket 10¹. The hub bosses 28 extend through diametrically larger openings 24¹ in the opposite sides 23¹ of the housing 18¹ and the extreme ends of said bosses 28 abut against the webs 11¹ adjacent the annular openings 30 therein thus centering the bearing member 14¹ between said webs 11¹.

It will thus be seen that the fifth wheel construction herein shown and described possesses novel features over the constructions disclosed in my prior patents above identified, that the present construction possesses the advantages of increased stability, increased life of the cushioning members, maximum universal floating movement of the bearing member within the cushioning members, and uniform resistance to interrelative movement between these members.

While but several specific embodiments of the invention have been herein shown and described, it will be understood that certain details of the constructions shown may be altered or omitted without departing from the spirit of the invention as the same is defined by the following claims.

I claim:

1. A fifth wheel construction comprising a bracket provided with transversely spaced webs, a housing depending between said webs whose opposite sides are provided with aligned apertures, a transverse shaft of less diameter than that of said aligned apertures and having its opposite ends secured to said webs, an ellipsoidal bearing member pivotally mounted on the shaft within said housing and having its major axis extending forwardly-rearwardly of the fifth wheel, bosses integrally formed on opposite sides of the ellipsoidal bearing member and embracing portions of the shaft interjacent said webs, and cushioning means interposed between the ellipsoidal bearing member and its housing.

2. A fifth wheel construction comprising a bracket provided with transversely spaced webs, a housing depending between said webs whose opposite sides are provided with aligned apertures, a transverse shaft of less diameter than that of said aligned apertures and having its opposite ends secured to said webs, an ellipsoidal bearing member pivotally mounted on the shaft within said housing and having its major axis extending forwardly-rearwardly of the fifth wheel, bosses integrally formed on opposite ends of said ellipsoidal bearing member and embracing portions of the shaft, said bosses passing through said aligned apertures interjacent said webs, and cushioning means interposed between the ellipsoidal bearing member and its housing.

3. An ellipsoidal bearing member having trunnions concentric with its minor axis adapted for pivotal disposition upon its trunnions within a housing having cushioning means interposed between said member and its housing.

4. An ellipsoidal bearing member having trunnions concentric with its minor axis adapted for pivotal disposition upon its trunnions within a housing substantially centrally thereof and adjacent cushioning means interposed between said member and its housing.

CARL G. SEYFERTH.